United States Patent [19]

Lawther

[11] Patent Number: 5,683,204
[45] Date of Patent: Nov. 4, 1997

[54] APPARATUS AND METHOD FOR LAYING UNDERWATER PIPELINES

[76] Inventor: Gerald Howard Lawther, 302 4743 River Road West, Ladner, B.C., Canada, V4K 1R9

[21] Appl. No.: 601,210

[22] Filed: Feb. 14, 1996

[51] Int. Cl.[6] ........................................... F16L 1/16
[52] U.S. Cl. .................. 405/171; 405/172; 405/158; 405/169
[58] Field of Search .................................. 405/154, 158, 405/171, 172, 169

[56] References Cited

U.S. PATENT DOCUMENTS

| | | | |
|---|---|---|---|
| 4,127,006 | 11/1978 | Oosterkamp | 405/171 |
| 4,127,007 | 11/1978 | Mathieu et al. | 405/171 |
| 4,326,821 | 4/1982 | Stephens | 405/171 |
| 4,563,108 | 1/1986 | Ayers | 405/171 |

FOREIGN PATENT DOCUMENTS 2454992  5/1976  Germany ........................ 405/171

Primary Examiner—Tamara L. Graysay
Assistant Examiner—Frederick L. Lagman
Attorney, Agent, or Firm—Dean A. Craine

[57] ABSTRACT

An apparatus and method for laying underwater pipeline which includes a plurality of buoyancy control valves formed thereon. Each buoyancy control valve includes an air escape hole formed in the pipeline with a sliding weight member disposed in a first position upstream immediately adjacent to an air escape hole. During use, the air escape holes enables air to escape from the pipeline as it sinks at one end and descends to the sea floor in a catenary. As it descends to the sea floor, the sliding weight member slides via gravity from a first to a second position on the pipeline. When disposed in the second position, the sliding weight member covers the adjacent air escape hole. A hydraulically controlled restraining chain is disposed around the pipeline to control the sliding action of the sliding weight member until the pipeline has reached a pre-determine depth. When the pipeline has reached the desired depth, the chain is automatically removed and the sliding weight member is able to slide into the second position.

10 Claims, 6 Drawing Sheets

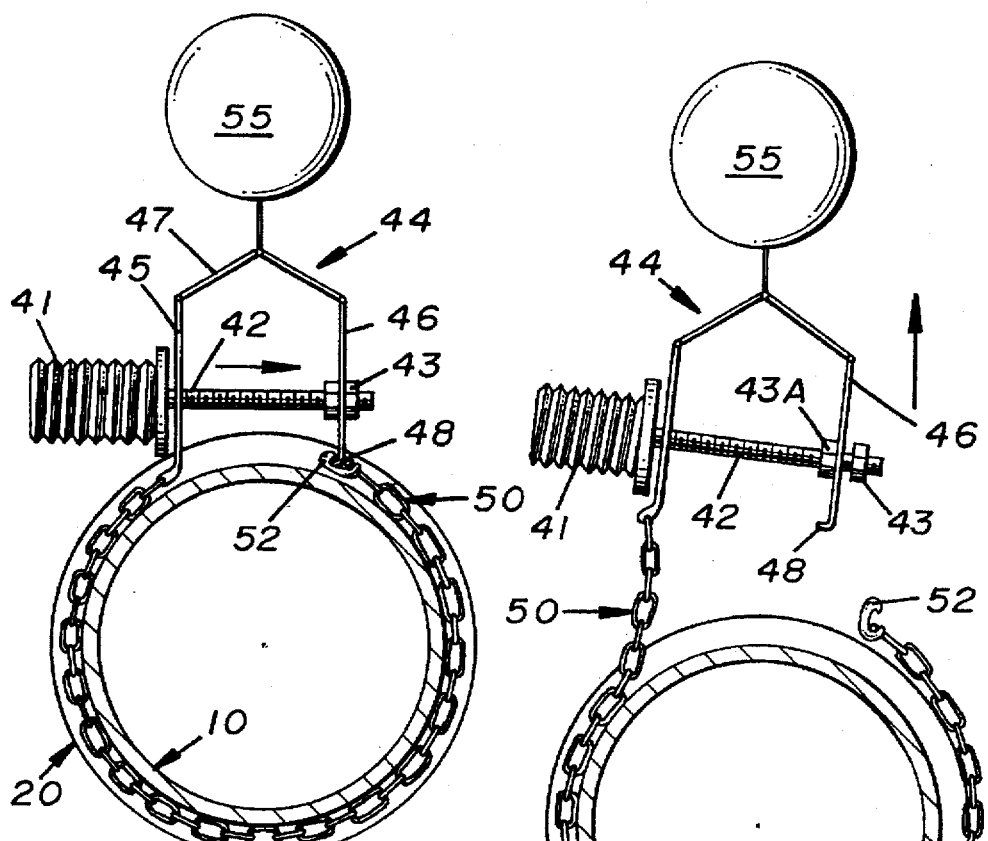
FIG. 8
FIG. 9
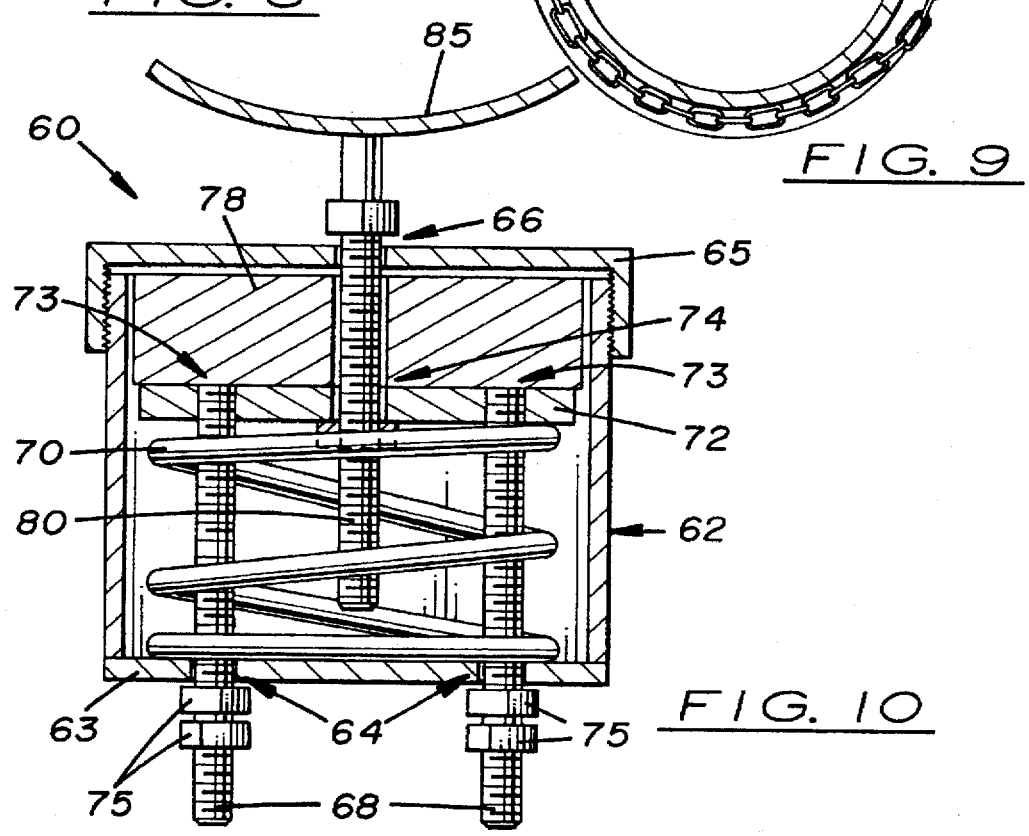
FIG. 10

APPARATUS AND METHOD FOR LAYING UNDERWATER PIPELINES

BACKGROUND OF THE INVENTION

1. Field of the Invention

The present invention relates to an apparatus and method for laying pipelines underwater, and more particularly, to such an apparatus and method in which the pipeline is made of semi-flexible material which sinks from the water surface to the sea floor by controlling the buoyancy thereof.

2. Description of the Related Art

Experience in the marine laying of continuous pipelines has shown that stress failure in sections of the pipeline can occur during the laying process as a result of uncontrollable sinking of the pipeline. Many methods of sinking the pipeline to the sea floor have been used, all of which require a great deal of surface support equipment, such as barges, tugs, divers, underwater vehicles and the like. Of particular concern are the stresses imposed on sections of the pipeline as a result of failure to sink the pipeline in a progressive, smooth manner.

When laying pipeline underwater which floats on a surface of the water prior to sinking, it is well known that the pipeline has the tendency to entrain buoyancy air in "high spots" in the pipeline causing a "sea serpent" condition during the laying operation. The entrained buoyancy air can also cause a blockage in the laid pipeline. Because it is difficult to control the vertical and horizontal movement of the pipeline as it sinks and descends to the sea floor, proper alignment of the pipeline on the sea floor is difficult to achieve. As a result, stress risers develop in sections of the pipeline, which, of course, threatens the integrity of the pipeline.

SUMMARY OF THE INVENTION

It is an object of the invention to provide an apparatus and method for laying a pipeline underwater.

It is another object of the invention to provide such an apparatus and method which reduces stresses imposed on sections of the pipeline during the laying procedure.

It is a further object of the invention to provide such an apparatus and method in which sinking procedures can be controlled to enable the pipeline to be laid in a desired location on the floor of a body of water.

The above stated objects of the invention are met by providing an apparatus and method for controlling the buoyancy condition of a pipeline as it descends to the floor of a body of water. Heretofore, "floor" shall refer to as a "sea floor" and "body of water" shall refer to all bodies of water, such as oceans, seas, lakes, ponds, rivers, etc.

The apparatus is a buoyancy control valve spaced apart and incorporating into sections of the pipeline structure which enable the entire pipeline structure to sink and descend to the sea bed in a smooth, controlled manner. When the entire pipeline structure is assembled, a plurality of buoyancy control valves are spaced apart at selected distances along the entire length of the pipeline structure.

Each buoyancy control valve includes a sliding weight member disposed over the pipeline section having an air escape hole formed therein. The air escape hole is formed in the pipeline section immediately adjacent and downstream from sliding weight member. During the sinking process, the sliding weight member slides longitudinally over the pipeline moving from the first position to a second position. When disposed in the second position, the sliding weight member closes the air escape hole. First and second stop means are provided which limit the longitudinal movement of the sliding weight member on the pipeline section so that its is positioned adjacent to the air escape hole.

During use, the pipeline is placed in the body of water directly over the desired location on the sea floor. A cap or plug is removed from the distal end of the pipeline structure. The distal end of the pipeline structure is then submerged thereby enabling water to enter the pipeline structure. As water enters, the air located inside the pipeline structure is forced through the air escape holes located upstream therefrom. As the air is forced outward, more water enters the pipeline thereby causing the pipeline to gradually sink towards its floating or proximal end.

As the pipeline gradually descends towards the sea floor, it forms a catenary with the its longitudinal axis being diagonally aligned. When the pipeline is submerged to a selected depth, a releasable retraining means attached to the sliding weight member is activated which allows the sliding weight member to move downward and longitudinally over the pipeline as the pipeline's longitudinal axis is inclined. During this movement, the sliding weight member moves from a first position to a second position on the pipeline to cover the adjacent air escape hole. A second stop means is used to limit the downward movement of the sliding weight member along the pipeline so that the sliding weight is centered over the air escape hole thereby completely covering it. The mass of each sliding weight member and the size of each air escape hole are predetermined to allow the correct amount of buoyancy air to escape from the pipeline structure to achieve progressive sinking by the effect of the sliding weight member. The sliding weight member also has sufficient mass so that the pipeline structure is permanently held in place on the sea floor. An optional sealing means is also provided with each buoyancy control weight to prevent water from entering the pipeline or prevent material from escaping the pipeline through the air escape hole.

Using the above described apparatus, a method for laying a pipeline underwater is disclosed herein.

BRIEF DESCRIPTION OF THE DRAWINGS

FIG. 8 is a sectional side elevational view taken along line 8—8 in FIG. 5, showing the releasable restraining means attached to the pipeline to hold the buoyancy control valve in a first position thereon.

FIG. 9 is sectional side elevational view similar to the FIG. 8, showing the releasable restraining means being released from the pipeline.

FIG. 10 is a side elevational view of an optional sealing device assembled prior to installation into the buoyancy control valve.

DESCRIPTION OF THE PREFERRED EMBODIMENT(S)

Figure 1:
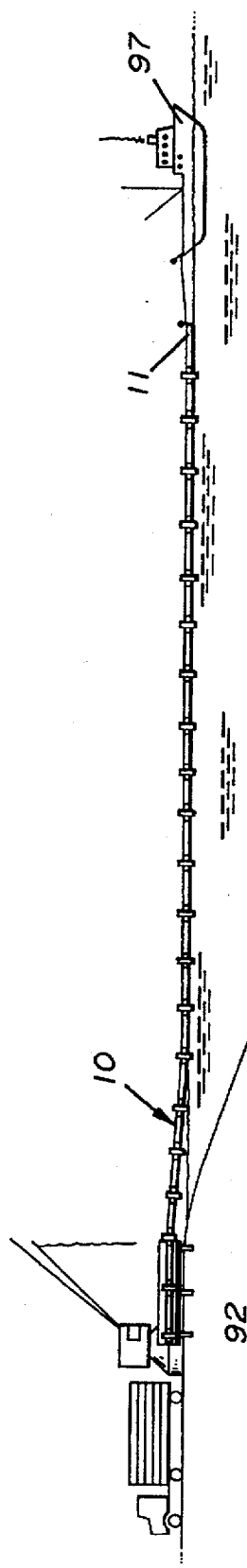
FIG. 1 is an illustration showing a pipeline being assembled and moved into position for underwater placement.
Figure 2:
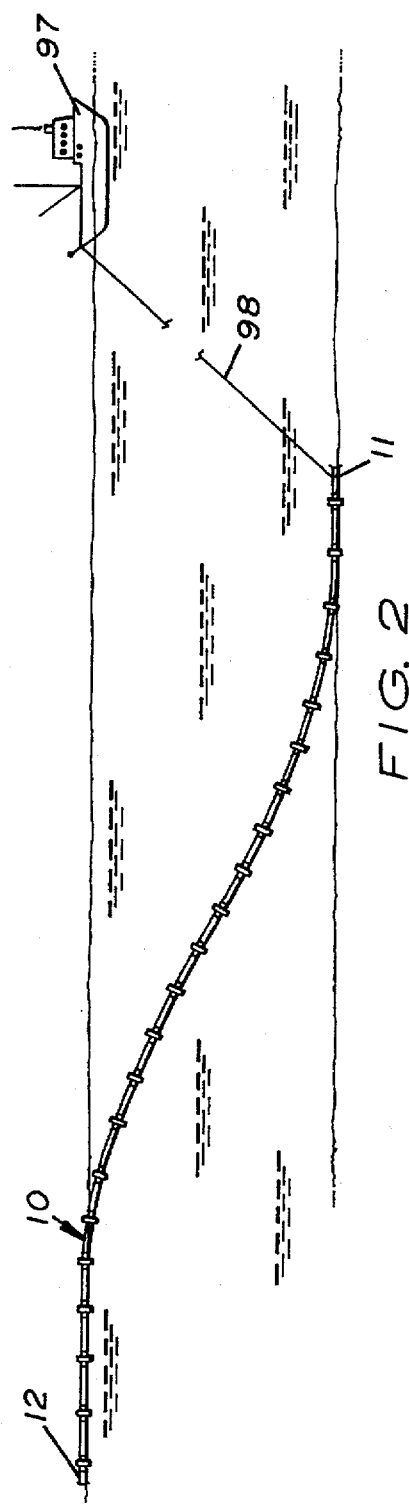
FIG. 2 is an illustration showing a pipeline being laid underwater using the apparatus and method disclosed herein.

The present invention comprises an apparatus and method for laying underwater pipeline on the sea floor. As shown in FIG. 1, a buoyancy control valve 12 is assembled on a pipeline section 10 which are then connected in an end-to-end manner to form an elongated pipeline structure, generally referred to as 11. As the buoyancy control valves 12 are assembled and the pipeline sections 10 connected together, the pipeline structure 11 is placed in the water and pulled away from shore 92 by a ship 97. The pipeline structure 11 is then placed in positioned over the desired location on the sea floor 95, the buoyancy control valves 12 and method disclosed herein are then used to gradually sink the pipeline structure 11 in a progressive, controlled manner to the sea floor 95. By using incorporating into the pipeline structure 11 a plurality of buoyancy control valves 12 and using this method, stresses on the pipeline structure 11 during the laying procedure is reduced and accurate placement of the pipeline structure 11 on the sea floor 95 is obtained.

Figure 4:
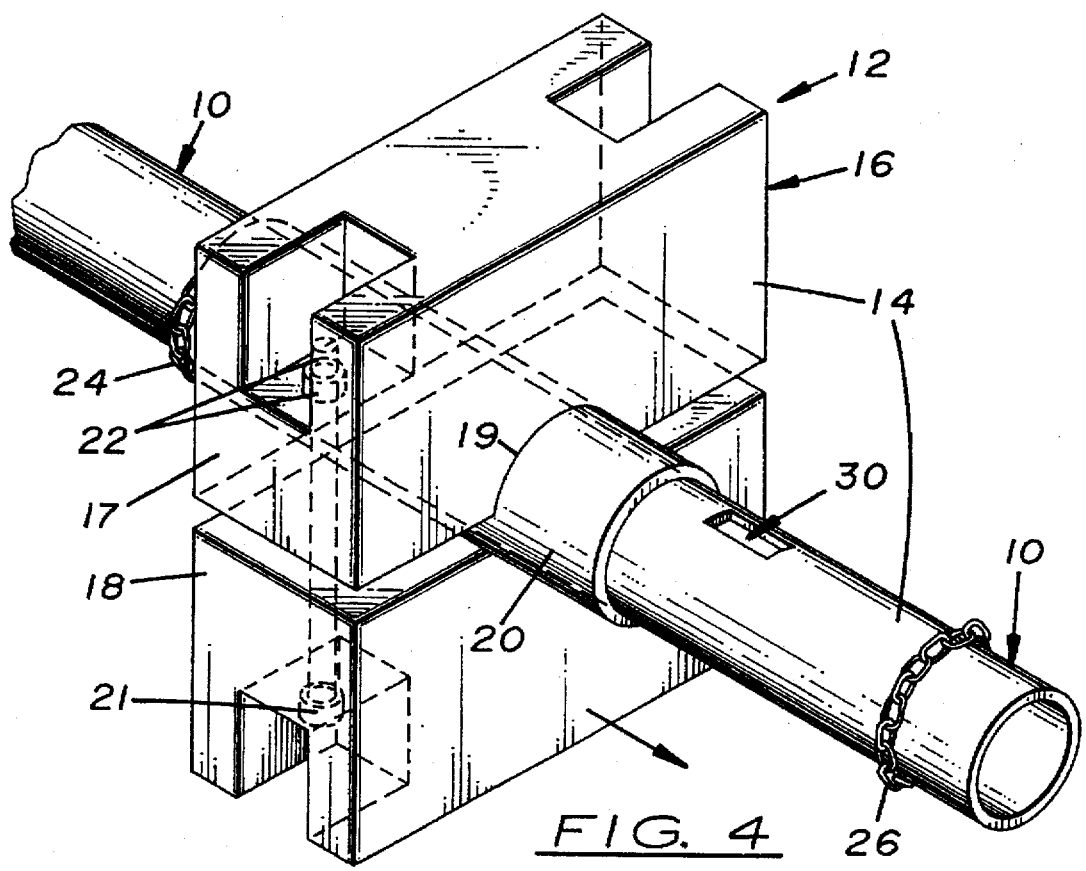
FIG. 4 is a perspective view of a section of pipeline with a buoyancy control valve attached thereto with its hydrostatic release means removed.
Figure 5:
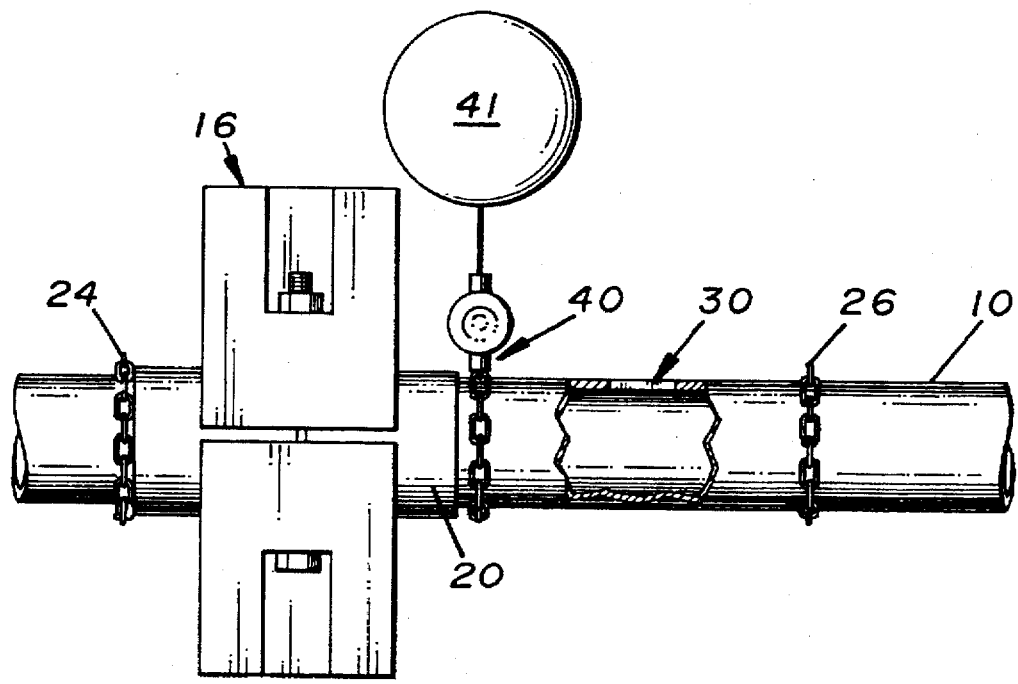
FIG. 5 is a side elevational view of a section of pipeline with a buoyancy control valve attached thereto.
Figure 6:
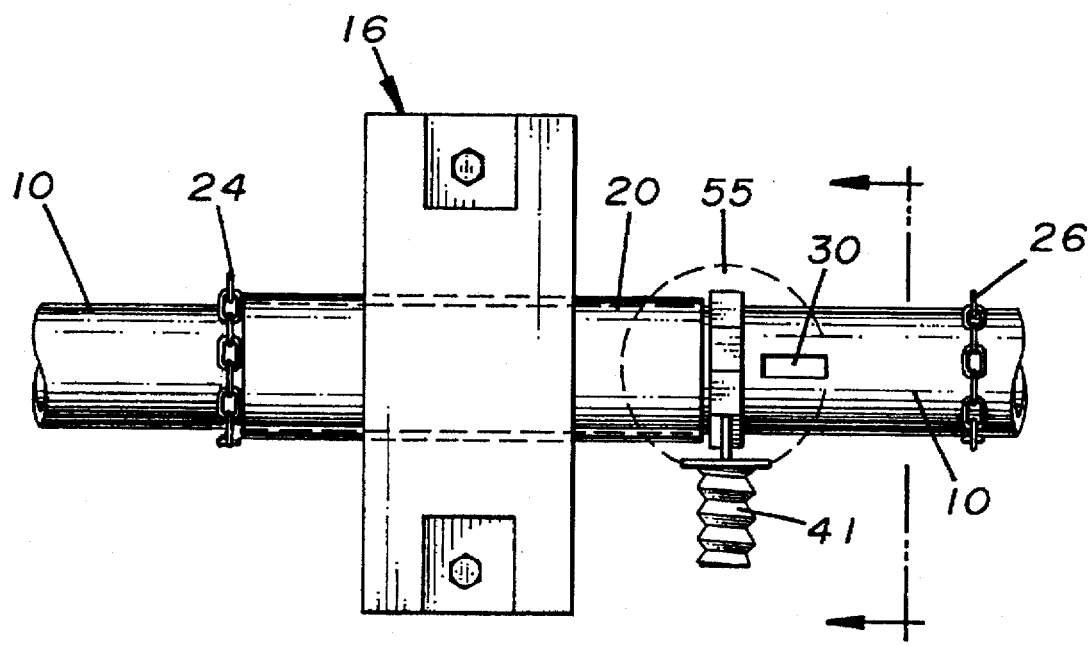
FIG. 6 is a top plan view of the section of pipeline shown in FIG. 5.
Figure 7:
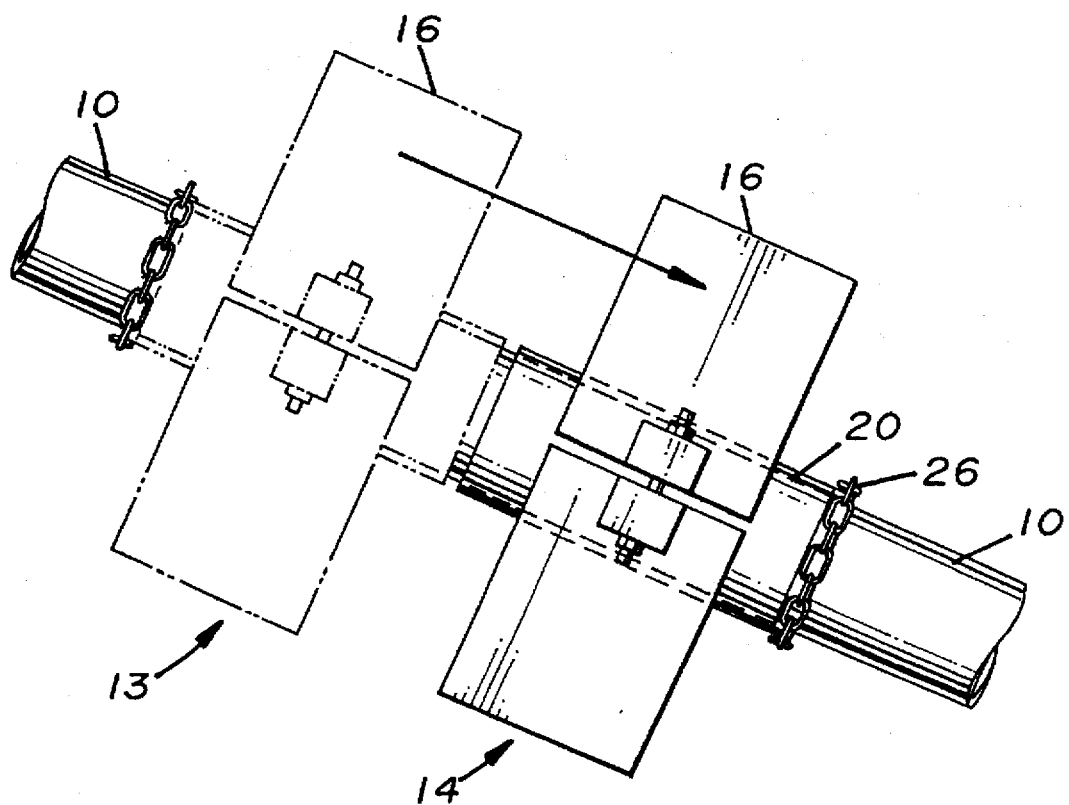
FIG. 7 is a side elevational view of the section of pipeline showing in FIGS. 5 and 6 showing the pipeline being diagonally disposed so that the buoyancy control valve moves from a first position to a second position to cover the adjacent air escape hole.

As shown in FIG. 4, each buoyancy control valve 12 includes a sliding weight member 16 attached to a sleeve member 20 designed to slide longitudinally and freely over a pipeline section 10. The inner diameter and the length of the sleeve member 20 is sufficient so that sleeve member 20 slides freely and closes the air escape hole 30 when disposed thereover. The weight member 16 is designed to provide sufficient weight so that the sleeve member 20 moves via gravity from a first position to a second position, denoted 13 and 14 in FIG. 7, on the pipeline 10 when the pipeline 10 is disposed at a selected inclination. The sliding weight members 16 is also designed to provide sufficient weight to hold the pipeline structure 11 in place on the sea floor 95 after placement.

In the embodiment shown in FIGS. 3-8, each sliding weight member 16 includes an upper block component 17 and a lower block component 18 each made of heavy, durable material, such as concrete. Each upper and lower block component 17, 18, respectively, has a semi-circular, traversely aligned cut-out 19 formed therein which enable them, to be stacked on opposite sides of the sleeve member 20 during assembly. A pair of bolts and nuts, 21, 22 respectively, (one shown) are used to interconnect the upper and lower block components 17, 18, respectively in a fixed position over the sliding weight member 16.

Attached to the pipeline structure 10 immediately upstream from each buoyancy control valve 12 is a first stop means which prevents the buoyancy control valve 12 from moving longitudinally in the upstream direction along the pipeline section 10. The first stop means is positioned along the pipeline section 10 so that the buoyancy control valve 12 needs only to slide a short distance over the pipeline section 10 to cover the adjacent air escape hole 30. In the embodiment shown, the first stop means includes a strap or chain 24 securely attached around the pipeline section 10 which prevents the sliding member 20 from sliding upstream along the pipeline section 10. In other embodiments, the first stop means may comprise a pin or stop surface directed attached to the side of the pipeline section 10.

A second stop means is attached to the pipeline section 10 on the opposite side of the air escape hole 30 to limit the downward movement of the sliding weight member 16 along the pipeline section 10. In the embodiment shown, the second stop means includes a strap or chain 26 securely attached around the pipeline section 10. In other embodiments, the second stop means may comprise a pin or stop surface directed attached to the side of the pipeline section 10.

As mentioned above, each sliding weight member 16 is designed to move downward along the pipeline section 10 to cover the adjacent air escape hole 30 when the pipeline 10 is submerged a selected depth and when the pipeline section 10 is disposed at a selected inclination. A releasable restraining means is used to selective control the movement of the buoyancy control valve 12 over the pipeline section 10. In the embodiment shown more clearly in FIGS. 7 and 8, the releasable restraining means is hydrostatically controlled which allows the buoyancy control valve 12 to move longitudinally along the pipeline section 10 when submerged at a selected depth. In the embodiment shown, the releasable restraining means, referred generally as 40, includes a bellows 41, a frame 44 and a strap or chain, hereinafter referred to as chain 50. The bellows 41 is attached to the frame 44 by a bolt 42 which extends from the outer face of the bellows 41 through the frame's two inner and outer leg members, 45, 46 respectively. A nut 43 is attached to the end of the bolt 42 which is used to adjustably fasten the bolt 42 to the outer leg member 46. The upper ends of the leg members 45, 46 are pivotally connected together by an end piece 47. An optional buoy 55 is attached to the end piece.

Attached to the distal end of the chain 50 is a clip 52 which engages a lip structure 48 formed on the distal end of the frame's outer leg member 46. During assembly, the nut 43 is adjusted on the bolt 42 so that the frame 44 is squeezed together to tighten the chain 50 in place around the pipeline 10. When tighten around the pipeline section 10 in this position, chain 50 prevents the sleeve member 20 from moving downward along the pipeline 10.

When the pipeline section 10 is submerged to a sufficient depth, the bellows 41 is contracted by hydrostatic forces which forces the end of bolt 42 to extend. In the process, the inner nut 43A is forced against inner face of the outer leg 46. The legs 45 and 46 are then forced apart causing the lip structure 48 to disengage from the clip 52. The distal end of the chain 50 attached to the clip 52 then falls from the pipeline 10 thereby enabling the buoy 55 to lift the bellows, frame, and chain 50 to the water surface for recovery. When the chain 50 is removed from the pipeline section 10, the sleeve member 20 is able to move via gravity downward over the pipeline section 10 thereby covering the adjacent air escape holes 30.

It should be understood that other releasable restraining means could be used in place of the hydrostatically controlled restraining means described above. For example, the bellows 41 could be replaced by a pneumatic device controlled locally or off-site. It should also be understood that the size and shape of the weight members and the air escape holes 30 can vary. In practice, the actual size and weight of the sliding weights and the size and shape of the air escape holes 30 formed on the pipeline will be calculated by those skilled in the art and dependent upon the local conditions and the negative buoyancy required by the design.

Figure 11:
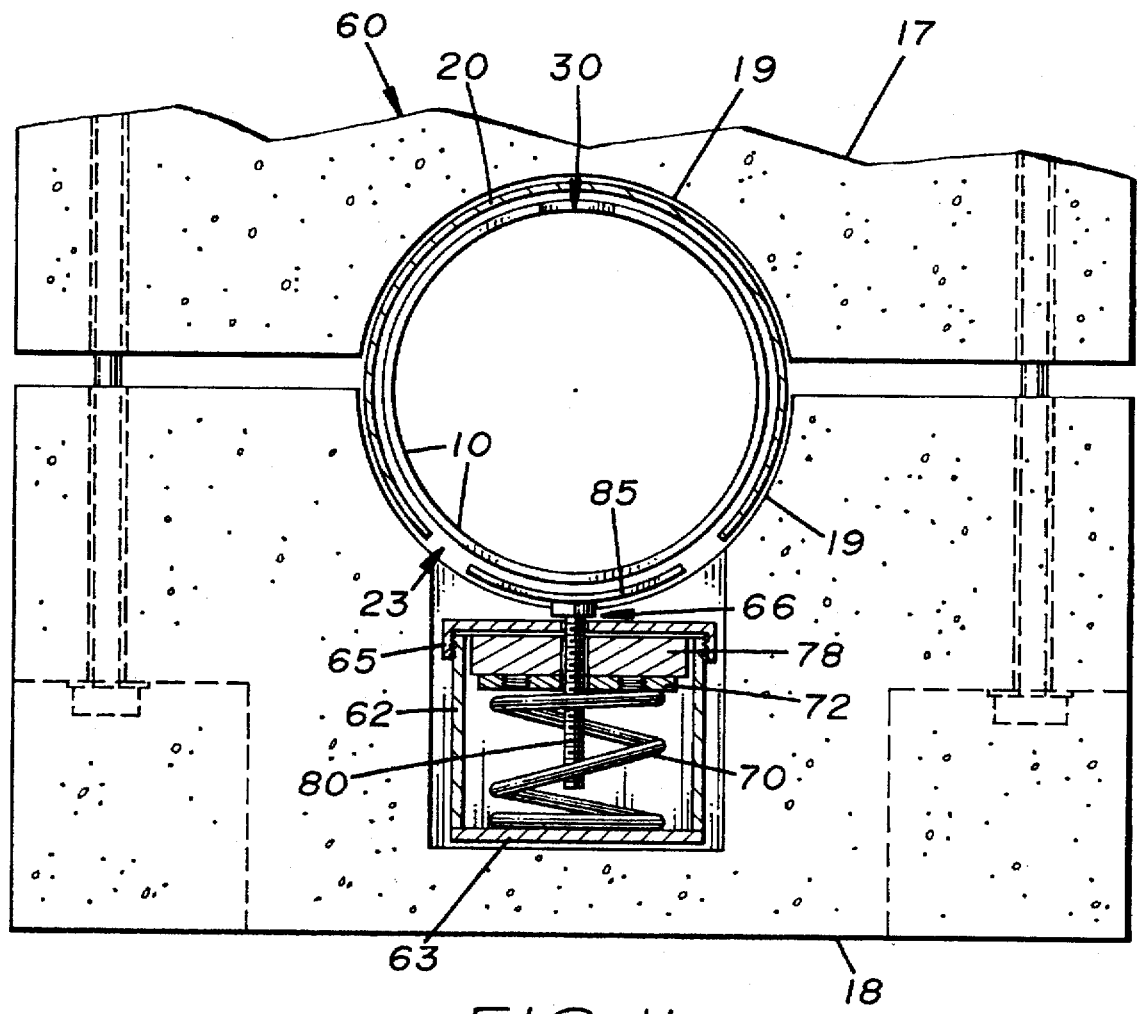
FIG. 11 is a front, sectional view on a buoyancy control valve with a sealing device assembled thereto.

FIGS. 10 and 11 show an optional sealing means incorporated into each buoyancy control valve 12 for sealing the air escape hole 30 when it is deemed important to ensure zero leakage therefrom. The sealing device, referred to as 60, which is initially assembled off-site, comprises an outer tube 62 made of steel other suitable material designed to fit into a modified lower block component 18 having a cylindrical-shaped cup 35 formed therein. The cup 35, shown more clearly in FIG. 11 aligned perpendicular to the cutout 19 and is opened at the cutout 19 and closed at the opposite end inside the lower block component 18. The side walls of the outer tube 62 are welded to a horizontal base plate 63. The upper end of the side walls are threaded to receive a pipe cap 65. A central hole 66 is manufactured in the pipe cap 65. The base plate 63 is pierced by two holes 64 through which two compression rods 68 are extended during initial assembly of the device 60. A 2,000 to 3,000 lb. compression spring 70 with a free height approximately 1 inch less than the height of the outer tube 62 is placed in the outer tube 62. Above the spring 70 is placed a compression plate 72 in which two threaded holes 73 have been drilled and tapped to receive the upper ends of the compression rods 68. The compression rods 68 are extended through the two holes 64 in the base plate 63. Suitable nuts 75 are screwed onto the ends of the compression rods 68 below the base plate 63 and the spring 70 is compressed to a static load of between 1,000 to 3,000 lbs. as required.

On top of the compression plate 72 is placed a soluble disc 78 made of high density salt, or other suitable chemical. The diameter of the soluble disc 78 is suitable for filling the outer tube 62 and of such thickness to achieve correct travel of the spring 70 and compression plate 72 and provide the designed load required when the soluble disc 78 dissolves. The pipe cap 65 is now screwed onto the top of the outer tube 62 to retain the soluble disc 70 in place. The compression rod screw down nuts 75 are now double-nutted which enable the compression rods 68 to be unscrewed from the pipe pressure plate 85.

Through the central hole 66 in the pipe cap 65 is extended a pipe plate adjusting stem 80 the lower section of which is threadingly connected to the thickened, threaded hole 74 formed in the center of the compression plate 72. The adjustment stem 80 is then rotated to connect it and to adjust the desired travel of the pipe pressure plate 85 to apply the released spring pressure and move the portion of pipeline immediately above the pipe pressure plate 85 into intimate contact with the inside surface of the sleeve member 20 with the required pressure to ensure zero liquid escape from the air escape hole 30. The pipe pressure plate 85 is interchangeable and radiused to have intimate contact with the outer diameter of the various sizes of main pipe used.

Once the sealing device 60 is assembled, it is now placed longitudinally into the cup 35 formed on the lower block component 18. The upper and lower block components 17, 18, respectively, are aligned and bolted together around a modified sleeve member 20. The modified sleeve member, referred to as 20A has a lower opening 23 formed on the opposite side of the air escape hole 30. The lower opening 23 enable the pipe pressure plate 85 to press against the pipeline 10 thereby forcing it upward against the opposite side of the sleeve member 20A.

When the pipeline 10 is launched into the water, each soluble disc 78 commences to dissolve and, after a pre-calculated period, releases the compression energy in the spring 70 which pushes the pipe pressure plate 85 against the adjacent section of pipeline which, in turn, forces it against the sleeve member 20A thereby sealing the air escape hole 30.

An important advantage of this invention, is that no further operational activities other than inspection by diver or underwater television are required. As those skilled in the art will be aware, the pipeline 10 can now be adjusted by cutoff or filler pieces at the shore end which is common to pipe laying practice.

Figure 3:
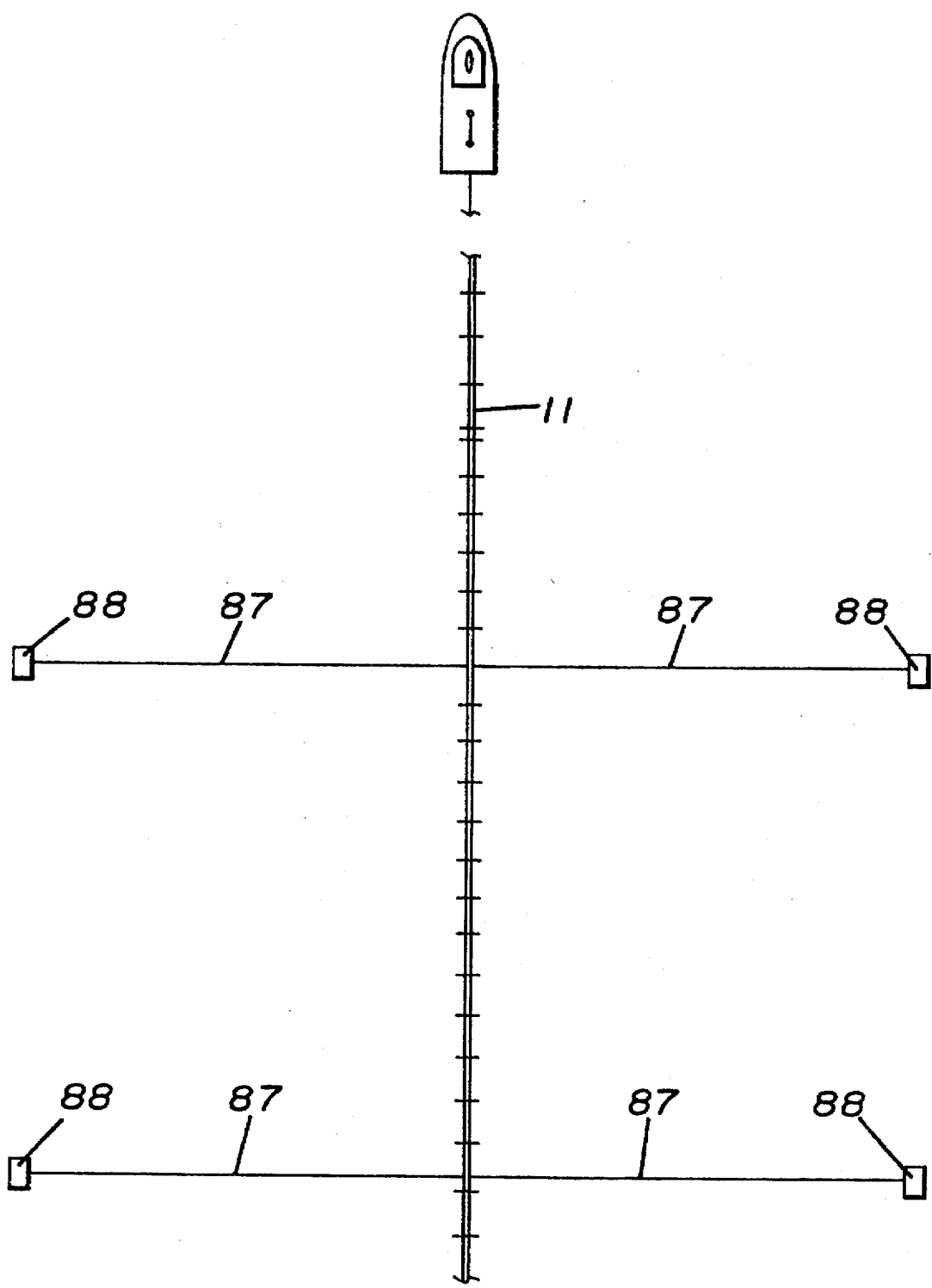
FIG. 3 a plan view of the pipeline showing the alignment lines and alignment anchors used to keep the laid pipeline in correct alignment on the sea floor.

As shown in FIG. 3, during transportation of the pipeline structure on the sea floor, alignment lines 87 are attached at various locations along the pipeline 10 and connected to alignment anchors 88 placed on the sea floor on opposite sides of the pipeline structure 10. The alignment lines 87 and alignment anchors 88 are used to counter wind and current action to hold the pipeline 10 in position over desired position on the sea floor.

Using the above described apparatus, a method of laying underwater pipeline structure 11 is provided commenced by first incorporating into the pipeline structure 11 a plurality of buoyancy control valves 12 and then moving it into proper position over the desired location on the sea floor. Once properly positioned, the outboard or distal end of the pipeline structure 11 is then opened so that water can enter therein. As mentioned above, as water enters the distal end, the pipeline structure 11 gradually begins to sink and the buoyancy air is forced shoreward in the sinking pipeline structure 11. As the pipeline structure 11 begins to sink, the air escaping from the air escape holes 30 forces the splash tape off the air escape holes 30. As the sinking process continues, the pipeline sections 10 are submerged a specific depth which causes the releasable restraining means to be released which enables the sleeve member 20 to slide downward over the adjacent air escape hole 30. Because the sinking procedure is carried out in a controlled, progressive manner, proper placement and alignment of the pipeline structure 11 on the sea floor 95 is easily maintained by restraining lines 98 attached to the ship 97. If optional buoys 55 are attached to the releasable restraining means, they are picked up from the water surface.

In compliance with the statute, the invention, described herein, has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A buoyancy control valve for an underwater pipeline, comprising:
   a) an air escape hole formed on a pipeline;
   b) a sliding weight member disposed over said pipeline upstream and adjacent to said air escape hole, said sliding weight capable of moving longitudinally and downward over said pipeline when said pipeline is disposed at a selected inclination, said sliding weight capable of completely closing said air escape hole when disposed thereover;
   c) a first stop means disposed between said pipeline and said sliding weight member which disposes said sliding weight member in a first position on said pipeline immediately adjacent and immediately upstream from said air escape hole;
   d) a second stop means disposed between said pipeline and said sliding weight member to disposed said sliding weight in a second position on said pipeline adjacent and immediately downstream from said air escape hole, said second stop means being located so that said sliding weight member covers said air escape hole when disposed in said second position; and, e) a releasable restraining means disposed between said pipeline and said sliding weight member for selectively controlling the longitudinal movement of said sliding weight member on said pipeline according to the submergence of said pipeline.

2. A buoyancy control valve for an underwater pipeline, as recited in claim 1, wherein said sliding weight member includes an upper block component, a lower block component, and a sleeve member, said sleeve member disposed over said pipeline capable of freely sliding longitudinally thereover and covering said air escape hole, said upper block component and said lower block component being interconnected and attached to said sleeve member.

3. A buoyancy control valve for an underwater pipeline, as recited in claim 2, wherein said first stop means is a chain attached around said pipeline.

4. A buoyancy control valve for an underwater pipeline, as recited in claim 2, wherein said second stop means is a chain attached around said pipeline.

5. A buoyancy control valve for an underwater pipeline, as recited in claim 2, wherein said releasable restraining means includes a bellows, a frame, and a chain, said bellows and said frame and said chain being connected together so that when said pipeline is submerged a pre-determined depth, said chain is released therefrom which enables said sliding weight member to move from said first position to said second position.

6. A buoyancy control valve for an underwater pipeline, as recited in claim 2, further including a sealing means incorporated therein to prevent leakage from said air escape holes.

7. A buoyancy control valve for an underwater pipeline, as recited in claim 6, wherein said sealing means includes means for forcing said air escape hole against said sliding weight member thereby sealing said air escape hole.

8. A buoyancy control valve for an underwater pipeline, as recited in claim 7, wherein said means for forcing said air escape hole against said sliding weight member is a hydrostatically controlled biased, pipe pressure plate.

9. A buoyancy control valve for an underwater pipeline, comprising:

a) an air escape hole formed on a pipeline;

b) a sliding weight member disposed over said pipeline upstream and adjacent to said air escape hole, said sliding weight member includes an upper block component, a lower block component, and a sleeve member, said sleeve member disposed over said pipeline capable of freely sliding longitudinally thereover and covering said air escape hole when said pipeline is disposed at a selected inclination, said upper block component and said lower block component being interconnected and attached to said sleeve member;

c) a first stop means disposed between said pipeline and said sliding weight member which disposes said sliding weight member in a first position on said pipeline immediately adjacent and immediately upstream from said air escape hole;

d) a second stop means disposed between said pipeline and said sliding weight member to disposed said sliding weight in a second position on said pipeline adjacent and immediately downstream from said air escape hole, said second stop means being located so that said sliding weight member covers said air escape hole when disposed in said second position;

e) a releasable restraining means disposed between said pipeline and said sliding weight member for selectively controlling the longitudinal movement of said sliding weight member on said pipeline according to the submergence of said pipeline, said releasable restraining means includes a bellows, a frame, and a chain, said bellows and said frame and said chain being connected together so that when said pipeline is submerged a pre-determined depth, said chain is released therefrom which enables said sliding weight member to move from said first position to said second position; and, f) a sealing means incorporated therein to prevent leakage from said air escape holes.

10. A method for laying pipeline underwater, comprising the following steps:

a) selecting a pipeline having a plurality of spaced apart, buoyancy control valves incorporated therein, each said buoyancy control valve includes an air escape hole formed in said pipeline and a sliding weight member, said sliding weight member capable of selectively moving between first and second positions along said pipeline to open and close said air escape hole and thereby, control the buoyancy of said pipeline to enable said pipeline to be submerged and laid in a progressive, controlled manner;

b) disposing said pipeline on a body of water; and, c) submerging one end of said pipeline so that water begins to enter and force air therefrom through said air escape holes so that said pipeline begins to progressively sink to the sea floor of said body of water and said buoyancy control valves are activated when said pipeline is submerged a selected depth to close said air escape holes.

\* \* \* \* \*